June 21, 1932.  A. LARSON  1,863,906
PIPE JOINT FILLER
Filed Oct. 13, 1930
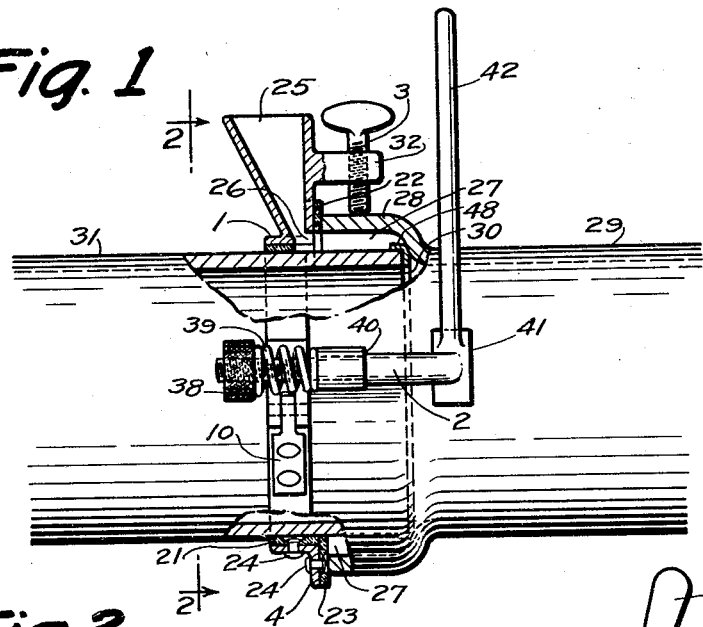
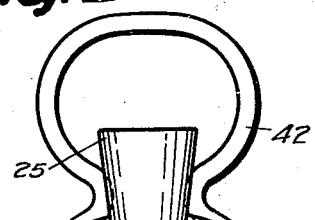
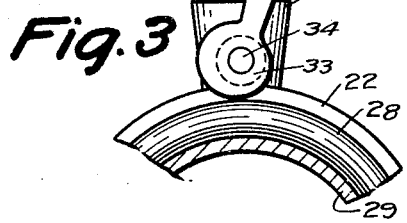
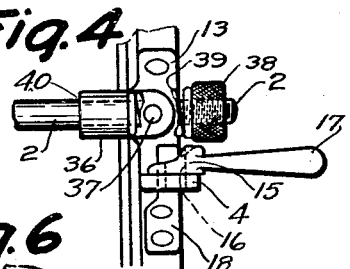
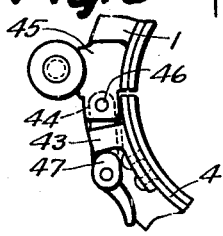
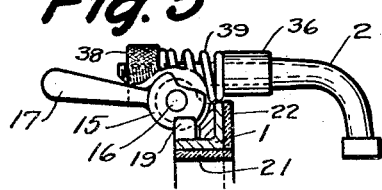
INVENTOR
Andrew Larson
BY
Harry Bowen
ATTORNEY Patented June 21, 1932

1,863,906

UNITED STATES PATENT OFFICE

ANDREW LARSON, OF SEATTLE, WASHINGTON

PIPE JOINT FILLER

Application filed October 13, 1930. Serial No. 488,355.

The invention is an attachment that may be applied to a bell joint in a line of pipe so that a filling material may be readily poured into the joint, and at the same time the two ends of the pipe will be rigidly held together and centered.

The object of the invention is to provide a simple and efficient device by which a filling material may readily be poured into the space in a bell joint between the inner surface of the bell and the outer surface of the adjoining pipe.

Another object of the invention is to provide a pipe joint filler by which both sections of the pipe are clamped together as they are filled.

Another object of the invention is to provide a pipe joint filler which is so constructed that the two sections of pipe may be centered while being filled.

A further object of the invention is to provide a pipe joint filler which is so constructed that the attachments for holding the filler to the pipe are positioned above the center so that the lower portion may readily be placed under the pipe.

And a still further object of the invention is to provide a pipe joint filler which is of a simple and economical construction.

With these ends in view the invention embodies an angular shaped flange adaptable to be placed around a section of pipe with the flange against the end of the bell of an adjoining pipe into which the end of the first pipe is placed, a hopper through which material may be poured through the flange into the space of the joint, suitable packing rings, means for adjusting the position of one pipe in relation to the other, and means for clamping the two sections of pipe together.

Other features and advantages of the invention will appear from the following description taken in connection with the drawing, wherein:—

Figure 1 is a side elevation of a pipe joint with parts broken away, showing the device as it would appear in use.

Figure 2 is an end elevation on line 2—2 of Figure 1 with the pipe omitted, showing the device as it would appear in use.

Figure 3 is a detail showing an alternate construction in which a cam shaped lever is used to adjust the relative positions of the pipe instead of the set screw shown in Figure 1.

Figure 4 is a detail showing the cam for clamping the upper and lower sections of the device together, looking in the direction of the arrows 4—4 on Figure 2.

Figure 5 is a sectional view looking downward upon the locking cam shown in Figure 2.

Figure 6 is a view showing an alternate arrangement in which a cam shaped lever is used for locking the two sections of the device together instead of the cam shown in Figure 2.

In the drawing the device is shown as it would be made wherein numeral 1 indicates the upper section of the angular flange, numeral 2 the clamping bolt, and numeral 3 the centering screw.

The angular flange may be made of any suitable material and of any suitable shape, and may be made to fit any desired size of pipe.

In the design shown this member is formed with an upper section which is indicated by the numeral 1, and a lower section which is indicated by the numeral 4. The vertical flange of the upper section is greater than a semi-circle and the ends extend downward to the points 5 and 6, as shown in Figure 2, whereas the ends of the horizontal flange extend downward to the points 7 and 8. At one side of the upper section 1 is a member 9 which is rigidly attached thereto, which, with the member 10 on the section 4, forms a hinge about a pin 11, and it will be noted that when the ends of the two sections at the opposite side of the device are free the lower section 4 may swing downward about this hinge as indicated by the dotted lines 12.

At the opposite side of the member 1 is a member 13 which extends downward having a horizontal flange 14 at the lower end upon which a cam 15 is pivotally held by a pin 16, and the cam 15 is provided with a handle 17 by which it may be operated. On the end of the member 4 is a member 18 which has a lug 19 at the uppper end that extends over the edge of the cam so that as the thin edge of the cam is started under the lug and the cam is rotated it will draw the lower section 4 upward against the lower side of the pipe so that the device may rigidly be clamped around the pipe.

Packing rings 20 and 21 may be attached to the inner surfaces of the horizontal members of the sections 1 and 4, and packing washers 22 and 23 may be attached to the vertical flanges of these members. These packing rings and washers may be made of any suitable material and may be attached to the flange sections by rivets 24, as shown in Figure 1, or by any other suitable means.

At the upper side of the member 1 is a hopper 25, the lower end of which opens through the section 1 with an opening 26 so that material poured into the hopper may pass through this member and into a space as indicated by the numeral 27, between a bell 28 formed on a section of pipe 29 and an end 30 of an adjoining section of pipe 31. This hopper may also be of any suitable shape and of any suitable size.

At the back of the hopper shown in Figure 1 is a lug 32 in which the set screw 3 is mounted, and it will be observed that with the attachment clamped around the pipe 31 the set screw 3 may be turned to adjust the position of the pipe 31 in relation to the pipe 29. In the design shown in Figure 3 the set screw 3 is replaced by a cam 33 which is pivotally mounted on a pin 34 at the back of the hopper, and the cam is provided with a lever 35 by which it may be adjusted so that it may also adjust the position of one pipe in relation to the other.

At the sides of the upper section 1 are sleeves 36 in which the rods 2 are freely held. These sleeves are pivotally attached to the members 9 and 13 by pins 37, as shown in Figure 4. The inner ends of the rods 2 are threaded as shown and provided with nuts 38 by which the tension of springs 39 may be adjusted. The rods 2 are formed with shoulders 40 which engage the outer ends of the sleeves 36 to limit their inward movement. At the outer ends of the rods 2 are plates 41, which engage the outer surface of the pipe 29 behind the bell 28, and it will be observed that by adjusting the nuts 38 the inner end 30 of the pipe 31 may be drawn against the inner portion of the bell 28 so that one section of pipe may be held tight against the other while the filling material is being poured into the space 27. A yoke 42 is attached to the plates 41 so that they may readily be withdrawn when removing the device or forced downward into place when installing the device. It will be understood that this yoke may be of any suitable size, or may be arranged in any suitable manner.

In the design shown in Figure 6 the section 4 is provided with a split lug 43, and the upper section 1 is provided with a bar 44 which is pivotally attached to a member 45 mounted thereon by a pin 46, and at the lower end of the bar 44 is a cam 47 which, when in the position shown, engages the lower side of the member 43 and draws the two sections of the device together to clamp it around the pipe. It will be understood that this device may be used, or the horizontal cam shown in Figures 2, 4 and 5 may be used, or any other device may be used to clamp the ends of the two sections together.

In order to seal the joint at the inner end or at the end of the straight section of pipe, a washer 48 may be placed between the end of the straight section of pipe and the inner end of the bell, as shown in Figure 1. This washer may be made of any suitable material and may be of any suitable shape. It is preferably made cup shaped, as shown in Figure 1, and it may be placed over the end of the straight section of pipe so that it will remain in place while this pipe is being inserted in the bell of the adjoining pipe. The washer may be shaped in any other manner to hold it to the pipe, or any other means may be used for holding it in place while it is being inserted.

It will be understood that other changes may be made in the construction without departing from the spirit of the invention. One of which changes may be in the use of other means for drawing the two sections of pipe together, another may be in the use of other means for centering one pipe in relation to the other, and still another may be in the use of other means for attaching the device to the pipe.

The construction will be readily understood from the foregoing description. In use the device may be attached to a straight section of pipe 31 by inserting the lower section 4 of the angular shaped member around the underside of the pipe and clamping the two open ends together by the cam shaped member 15 as shown in Figure 2 or with the member 47 as shown in Figure 6. It will be understood that when filling the joints of this pipe the pipe will be in a trench, the width of which is only slightly larger than the diameter of the pipe, so that it will be necessary to have the device made in two sections, as described, and the sections hinged together so that the lower section may be worked around the outside of the pipe between the pipe and trench until the free end thereof comes up sufficiently to be held and clamped to the free end of the upper section. It will be noted that by using the cam shaped members 15 and 47 these two sections may be rigidly clamped, and with the packing rings which may be made of rubber or any other suitable material, between the horizontal flanges of the members 1 and 4 it will be noted that the device will rigidly grip the pipe. The position of the device on the pipe will be determined by placing the device against the end of the bell of the adjoining pipe with the two sections of pipe together. At the same time the plates 41 may be forced downward around the adjoining section of the pipe so that they will hold against the inner end of the bell by the nuts 38. These plates may then be drawn against the end of the bell and the two sections of pipe drawn together and rigidly held by the rods 2, and the tension on these rods may be adjusted by the nuts. The straight section of pipe may then be centered in the bell of the adjoining pipe by the set screw 3 or by a cam 33 as shown in Figure 3. It will, therefore, be observed that the two pipes may be rigidly held together and one pipe may be centered in relation to the other before the filling material is inserted, and then tar, or other filling material may be poured into the hopper 25 so that it will flow downward and into the space between the outer surface of the straight section of pipe 31 and the inner surface of the bell on the pipe 29.

Having thus fully described the invention, what I claim as new and desire to secure by letters patent, is:—

1. In a filling device for joints of pipe of the type where a straight pipe end extends into the bell of an adjoining section of pipe, an annular member extending around said straight end and abutting the end of the bell, said annular member having an opening therethrough, a hopper corresponding with said opening, means on said annular member for centering the two sections of pipe in relation with each other, and means also on said annular member extending over the shoulder of the bell for holding said member, against the end of said bell.

2. In a device for filling joints of pipe of the type where a straight end of one piece of pipe extends into a bell at the end of an adjoining piece of pipe, an annular member comprising an upper and lower section hinged together and adapted to be placed around the section of pipe having the straight end and abutting the end of the bell of the adjoining section, means for clamping the free ends of the two sections together, said annular member having an opening therethrough, a hopper corresponding with said opening and positioned so that a filling material poured therein will flow through the opening and into the space between the outer surface of the straight section of pipe and the inner surface of the bell, and means on the said annular member for vertically centering one piece of pipe in relation to the other.

3. In a device for filling joints of pipe of the type where a straight end of one piece of pipe extends into a bell at the end of an adjoining piece of pipe, an angular member comprising an upper and lower section hinged together and adapted to be placed around the section of pipe having the straight end and abutting the end of the bell of the adjoining section, means for clamping the free ends of the two sections together, said angular member having an opening therethrough, a hopper corresponding with said opening and positioned so that a filling material poured therein will flow through the opening and into the space between the outer surface of the straight section of pipe and the inner surface of the bell, means on the said angular member for centering one piece of pipe in relation to the other, and arms extending from the said angular member over the opposite end of the bell of the adjoining pipe to hold the angular member against the end of the bell.

4. In a device for filling joints of pipe of the type where a straight end of one piece of pipe extends into a bell at the end of an adjoining piece of pipe, an annular member comprising an upper and lower section hinged together and adapted to be placed around the section of pipe having the straight end and abutting the end of the bell of the adjoining section, means for clamping the free ends of the two sections together, said annular member having an opening therethrough, a hopper corresponding with said opening and positioned so that a filling material poured therein will flow through the opening and into the space between the outer surface of the straight section of pipe and the inner surface of the bell, and arms extending from the said annular member over the opposite end of the bell of the adjoining pipe to hold the annular member against the end of the bell.

5. In a filling device for joints of pipe of the type where a straight pipe end extends into the bell of an adjoining section of pipe, an annular member extending around said straight end and abutting the end of the bell, said annular member having an opening therethrough, a hopper on said member corresponding with said opening, and means on said annular member extending over the shoulder of the bell for holding said member against the end of said bell.

In testimony whereof he affixes his signature.

ANDREW LARSON.